Figure 1:
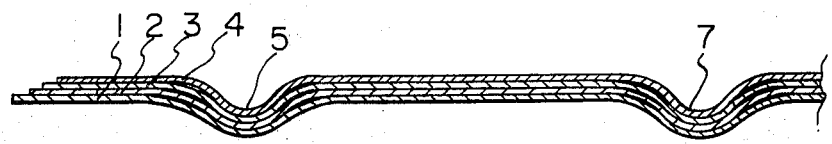

United States Patent [19]

Astill et al.

[11] 4,453,304
[45] Jun. 12, 1984

[54] METHOD OF PRODUCING A CORRUGATED, MULTI-PLY METAL BELLOWS

[75] Inventors: Cyril J. Astill; Peter Janzen, both of Deep River, Canada

[73] Assignee: Atomic Energy of Canada Limited, Ottawa, Canada

[21] Appl. No.: 381,538

[22] Filed: May 24, 1982

[30] Foreign Application Priority Data

Sep. 9, 1981 [CA] Canada ................................... 358435

[51] Int. Cl.³ .................... B23P 17/00; B21D 15/06; B21D 3/02
[52] U.S. Cl. .................................. 29/421 R; 72/59; 72/121
[58] Field of Search ................ 29/421 R, 454, 516, 29/523; 72/57, 58, 59, 115, 118, 370, 355

[56] References Cited

U.S. PATENT DOCUMENTS

| | | | |
|---|---|---|---|
| 370,876 | 10/1887 | Kane | 72/118 |
| 3,015,354 | 1/1962 | Wood | 72/59 |
| 3,260,088 | 7/1966 | Gruetter et al. | 72/115 |
| 3,473,358 | 10/1969 | Marcovitch | 72/121 |
| 3,704,983 | 12/1972 | Tellot | 72/59 |
| 3,832,877 | 9/1974 | Tominaga et al. | 72/59 |
| 4,215,559 | 8/1980 | Kuypers | 72/121 |
| 4,364,252 | 12/1982 | Koizumi | 72/59 |

Primary Examiner—Howard N. Goldberg
Assistant Examiner—S. Nichols
Attorney, Agent, or Firm—Francis W. Lemon

[57] ABSTRACT

A method of producing a multi-ply metal bellows wherein the plies are telescoped together to form a multi-ply tube and annular grooves are inwardly rolled in the multi-ply tube at spaced intervals therealong while the tube is supported internally on either side of the grooves, as they are rolled, and is held against substantial deformation. Crest and root constraining dies are assembled around the multi-ply tube and in the grooves and then the tube is pressurized internally, while the dies are pushed together, so that the undeformed portions of the tube bulge outwardly into the dies. The bellows is then completed by removing the dies and putting spacing shims in between the bulged convolution crest portions and then pushing the ends of the tubes until the shims are lightly held between the bulges.

4 Claims, 10 Drawing Figures

METHOD OF PRODUCING A CORRUGATED, MULTI-PLY METAL BELLOWS

This invention relates to a method of producing a corrugated, metal bellows.

It is known from U.S. Pat. No. 1,644,823, dated Oct. 11, 1927, H. B. Fay, to first subject a relatively thin tubular wall to the mechanical action of cooperative rolls, disposed on opposite sides of the tube wall, to form a lengthwise extending series of spaced, annular grooves around the tube wall, and then to outwardly expand the tube by fluid pressure, while partible dies are located around the tube wall and in the grooves, to form a bellows.

While the Fay patent discloses a useful process for the production of a single ply, easily formed, thin wall metal bellows there is still a need for process for producing a multi-ply metal bellows with strong walls for use in high pressure systems wherein the plies are evenly layered around and between annular grooves thus ensuring that in the final hydraulic forming operation the material in each ply is stretched by an equal amount around the convolution crests and walls.

It is not possible, if the bellows is to have more than about four convolutions, to adequately support the internal rollers in the Fay patent when inward rolling the annular grooves of a multi-ply or heavy wall tube.

For this reason many manufactures roll the annular groove into multi-ply tubes without internal tube support. This however allows each ply to take on a slightly different form with progressively less material in each ply which in turn leaves considerably less axial length of tube in the inner ply which must be hydraulically stretched to the same length as the material in the outer ply.

These uncontrolled variables in the manufacturing process lead to inconsistent test results of the end product.

According to the present invention there is provided a method of producing a corrugated, multi-ply, metal bellows, comprising:

(a) telescoping together, in a substantially coextensive manner, a number of tubular, metal plies to form a multi-ply tube, then (b) successively, from a first end of the multi-ply tube, internally supporting in substantially the tubular form, only portions of the multi-ply tube which are to be adjacent opposite sides of each of a series of longitudinally spaced, annular grooves to be inwardly formed in the multi-ply tube, each of said portions of the multi-ply tube being supported by a series of tapered, rounded corner forming, rollers roller cage around a tapered, annular supporting surface of on a supporting shaft extending through, and supported at each end of, the multi-ply tube, the tapered rollers being moved radially outwardly into lengthwise, supporting engagement with, and withdrawn from, the multi-ply tube by relative movement along the axis of the tube, between the tapered rollers and their supporting surfaces, while (c) successively, inwardly rolling, from the first end of the multi-ply tube, each of the series of longitudinally spaced, annular grooves with rounded corners, in the multi-ply tube, while only the said portions of the multi-ply tube adjacent opposite sides of that annular groove are supported in the said substantially tubular form to remain substantially undeformed, and while the multi-ply tube is allowed to decrease in length to accommodate the formation of the annular grooves, the series of longitudinally spaced, annular grooves providing, (i) annular grooves adjacent outer extremities of bellows cuffs forming portions of the multi-ply tube, and (ii) annular grooves where root portions of corrugations are to be located at positions between the bellows cuffs forming portions, then (d) separating the multi-ply tube from the supporting shaft and radially displaceable rollers and assembling spaced, corrugation root constraining and crest forming dies externally in and circumferentially around each of the annular grooves at which root portions of the corrugations are to be located, the dies being spaced from each other and having substantially planar sides extending outwardly from the multi-ply tube and tangentially from inner, rounded root constraining ends to outer crest forming end portions, then (e) assembling end crest forming dies externally in and circumferentially around each of the annular grooves adjacent the outer extremities of the bellows cuffs forming portions of the multi-ply tube, the end crest forming dies being spaced from the corrugation root constraining and crest forming dies and having substantially planar sides extending outwardly from the multi-ply tube and tangentially from rounded corner portions leading from inner extremities of the tube portions which are to form the bellows cuffs, to outer crest forming end portions, then (f) pressurizing the bore of the multi-ply tube with a fluid with the dies in position while pushing the ends of the multi-ply tube together to outwardly bulge the said substantially undeformed portions, adjacent annular grooves where root portions of corrugations are to be located, to follow the substantially planar sides of the dies and form annular folds with rounded crests, then (g) removing all of the dies from the annular grooves, then (h) placing spacing shims around the multi-ply tube and between the folds, and compressing the multi-ply tube longitudinally until all of the folds are brought into contact with and gently hold, the spacing shims therebetween, and then (i) releasing the thus formed multi-ply bellows from the longitudinally applied compression and removing the shims therefrom.

In some embodiments of the present invention the ends of the multi-ply tubing are pushed together, while the bore of the multi-ply tube is pressurized with a fluid, by holding one of the end crest forming dies against movement, in the direction of the longitudinal axis of the multi-ply tubing, while pushing the other end crest forming die in this direction and towards the held end crest forming die.

In some embodiments of the present invention both series of radially displaceable rollers taper, in a divergent manner along their axis of rotation, towards one another and are supported on corresponding tapering, annular supporting surfaces, and the rollers are retractable radially by relative movement along the axis of the multi-ply tube of the supporting surfaces moving them apart.

In some embodiments of the present invention both series of rollers are held spaced apart and are retracted radially by movement of one supporting surface, supporting one series of rollers, away from the other supporting surface supporting the other series of rollers.

Figure 2:
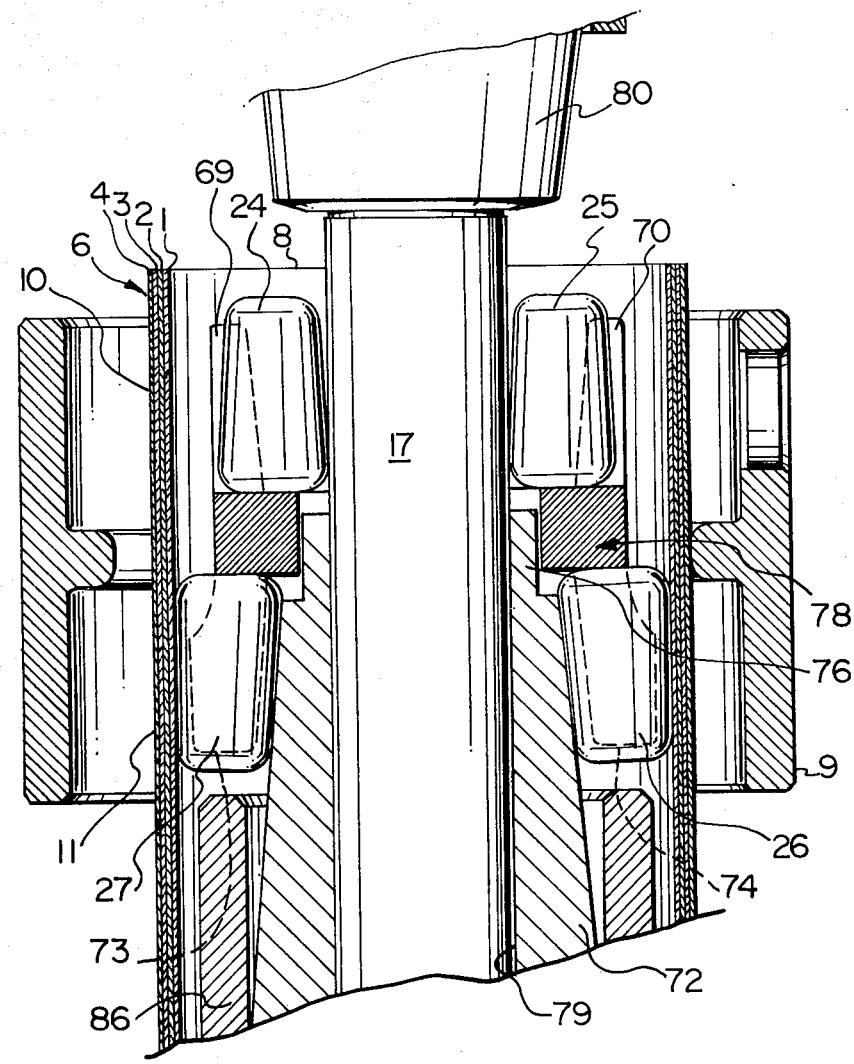
Figure 3:
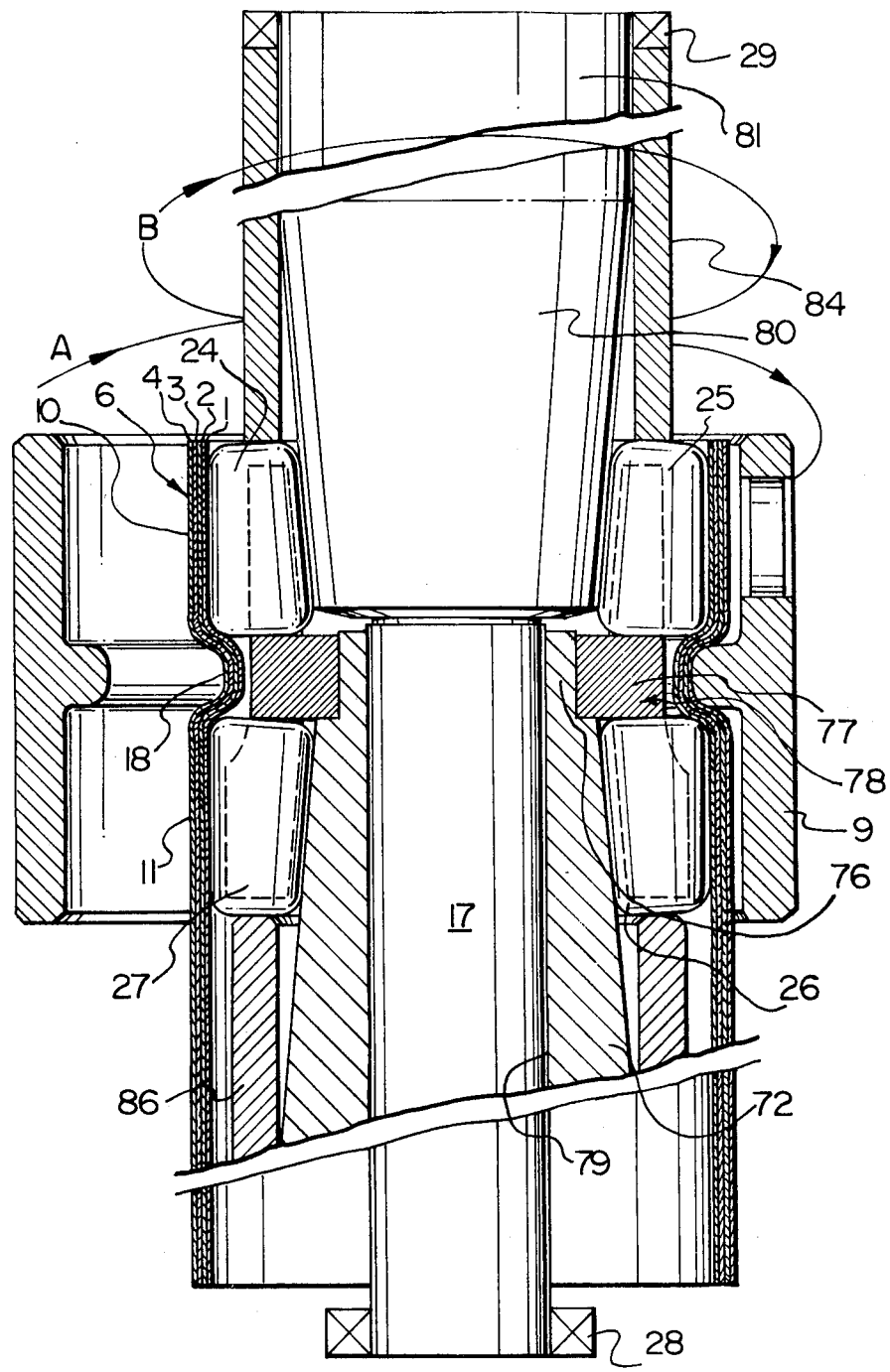
Figure 4:
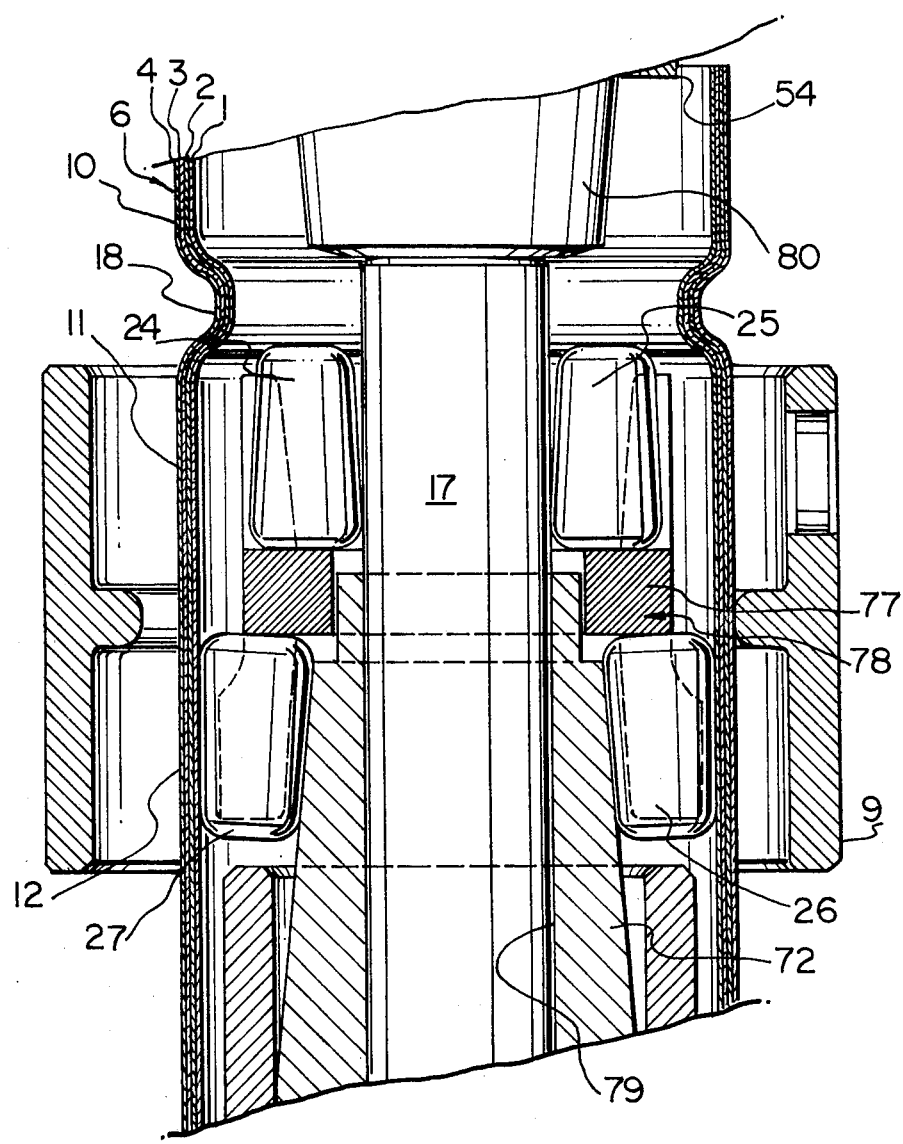
Figure 5:
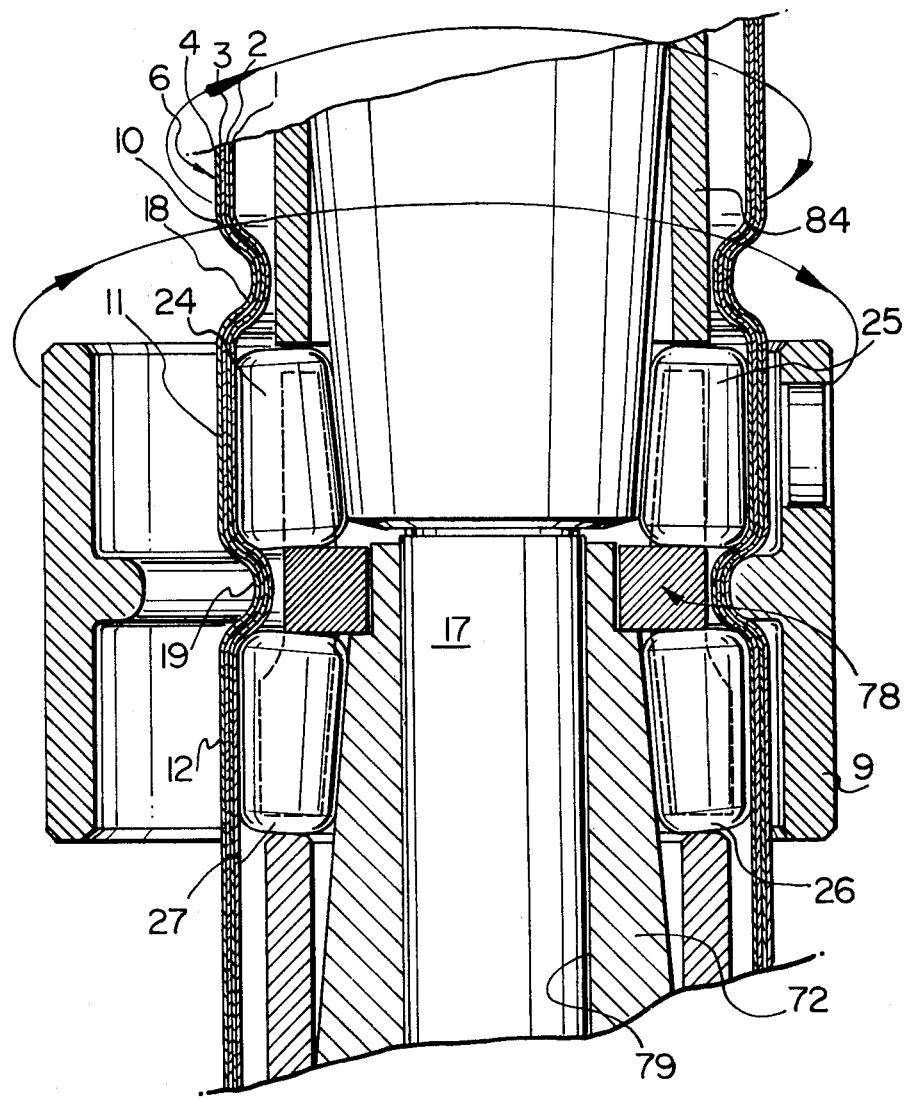
Figure 6:
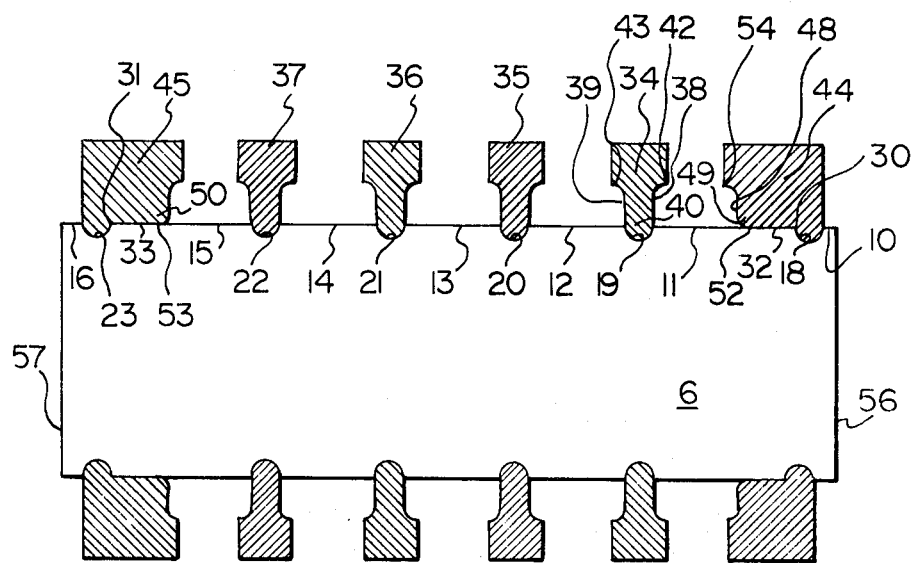
Figure 7:
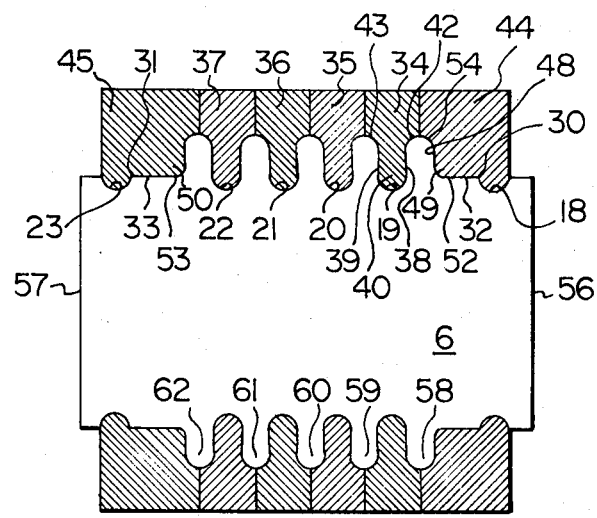
Figure 8:
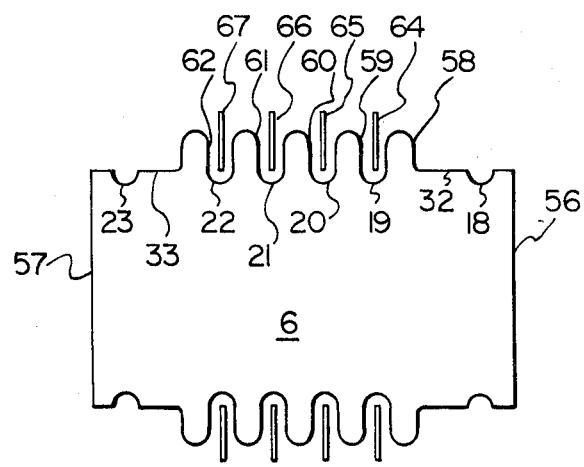
Figure 9:
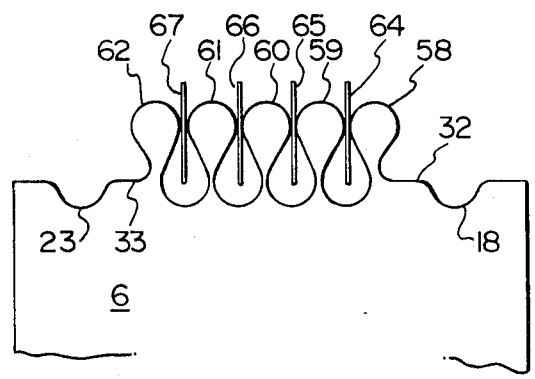
Figure 10:
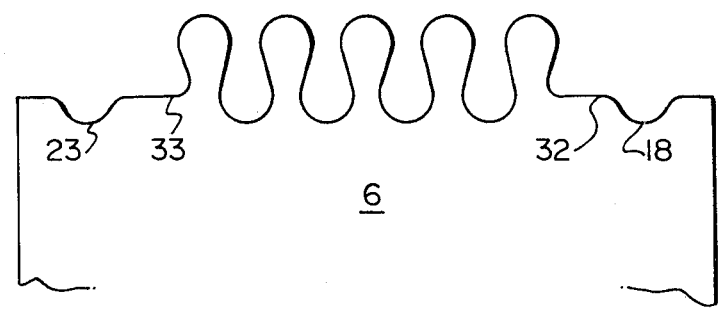

In the accompanying drawings which illustrate a conventional bellows and by way of example, an embodiment of the present invention, FIG. 1 is a sectional side view through one wall of a conventional multi-ply bellows wherein the annular grooves have been inwardly rolled without internal tube support, FIG. 2 is a sectional side view of an end portion of four tubular, metal plies telescoped together coextensively, supported by radially displaceable rollers on a supporting shaft, and located within a roll for inwardly rolling annular grooves in the multi-ply tube comprising the tubular, metal plies, FIG. 3 is a similar view to FIG. 2 with the roll rolling an annular groove in the multi-ply tube adjacent bellows cuffs forming portions of the multi-ply tube, FIG. 4 is a similar view to FIG. 3 with the roll, and the radially displaceable rollers on the supporting shaft moved further along the multi-ply tube to a position for rolling an annular groove in the multi-ply tube where a root portion of a corrugation is to be located at a position between the bellows cuffs forming portions, FIG. 5 is a similar view to FIG. 4 with the roller rolling the annular groove in the multi-ply tube where a root portion of the corrugation is to be located, FIG. 6 is a sectional side view of corrugation root constraining and crest forming dies, and end crest forming dies, assembled in annular grooves in the multi-ply tube, FIG. 7 is a similar sectional side view to FIG. 5 after the bore of the multi-ply tube has been fluid pressurized while the ends of the tube are pushed towards each other to outwardly bulge substantially undeformed portions of the multi-ply tube into humps, FIG. 8 is a sectional side view of a portion of the multi-ply tube shown in FIG. 7 after the dies have been removed and spacing shims have been placed around the tube between the humps FIG. 9 is a similar section side view to FIG. 8 of a portion of the multi-ply tube but with the ends pushed together to gently hold the spacer shims between the bulges, and FIG. 10 is a section side view of the portion of the multi-ply bellows formed in FIG. 9 by releasing the force pushing the ends of the multi-ply tube together and removing the spacer shims.

Referring now to FIG. 1, a conventional multi-ply bellows is shown, comprising four plies end portions which are designated 1 to 4, wherein the annular grooves 5 and 7 have been inwardly rolled in a known manner without internal support being provided for the plies 1 to 4.

It will be seen from FIG. 1 that inwardly rolling the annular grooves in the known manner produces poor layering of, and voids between, the plies 1 to 4 to the sides of the annular grooves 5 and 7. This leaves less material in the inner plies, by producing a progressive, inward creep of the plies 1 to 4 towards the outer plies, so that when the bellows is being formed the inner plies are stretched to a greater extent than the outer ones and are weakened.

In FIGS. 2 to 10 similar parts to those shown in FIG. 1 are designated by the same reference numerals.

Referrring to FIGS. 2 to 10, a method of producing a corrugated, multi-ply, metal bellows according to the present invention is shown which comprises:

(a) telescoping together, in a substantially coextensive manner, a number of tubular, metal plies portions of which are designated 1 to 4 (FIG. 2) to form a multi-ply tube 6, then (b) successively, from a first end 8 of the multi-ply tube 6, internally supporting in substantially the tubular form, portions, only designated 10 to 16 (FIG. 3) of the multi-ply tube 6 which are to be adjacent opposite sides of each of a series of longitudinally spaced, annular grooves 18 to 23 to be inwardly formed in the multi-ply tube 6, each of said portions 10 to 16 of the multi-ply tube 6 being supported by a series of tapered, rounded corner forming rollers, two of one series are shown and designated 24 and 25 and two of the other series are shown and designated 26 and 27, spaced by a roller cage 78 around a tapered, annular supporting surface on a supporting shaft 17 extending through, and supported at each end of, the multi-ply tube 6, by bearings 28 and 29 (FIG. 3, the tapered rollers such as 24 to 27 being moved radially outwardly into lengthwise, supporting engagement with, and withdrawn from, the multi-ply tube 6 by relative movement along the axis of the tube 6, between the tapered rollers such as 24 to 27 and their supporting surfaces) while (c) successively, inwardly rolling, by means of an orbiting type, groove forming roller 9, from the first end 8 of the multi-ply tube 6, each of the series of longitudinally spaced, annular grooves 18 to 23 with rounded corners, in the multi-ply tube 6, while only the said portions, for example 10 and 11, of the multi-ply tube 6 adjacent opposite sides of that annular grooves, for example 18, are supported in the said substantially tubular form to remain substantially undeformed, and while the multi-ply tube 6 is allowed to decrease in length to accommodate the formation of the annular grooves 18 to 23, the series of longitudinally spaced, annular grooves 18 to 23 providing, (i) annular grooves 18 and 23 (FIGS. 3 and 4) adjacent outer extremities 30 and 31 of the multi-ply tube 6, and (ii) annular grooves 19 and 22 (FIGS. 4 and 5) where root portions of corrugations are to be located at positions between the bellows cuffs forming portions 32 and 33 respectively, then (d) separating the multi-ply tube 6 from the supporting shaft 17 and the radially displaceable rollers such as 24 to 27 and assembling spaced, corrugation root constraining and crest forming dies 34 to 37 (FIGS. 6 and 7) externally in and circumferentially around each of the annular grooves 19 to 22 respectively at which root portions of the corrugations are to be located, the dies 34 to 37 being spaced from each other and having substantially planar sides, such as sides 38 and 39 of die 34, extending outwardly from the multi-ply tube 6 and tangentially from inner, rounded root forming ends, such as root constraining portion 40 of die 34, to outer, rounded crest forming end portions, such as crest forming portions 42 and 43 of die 34, then (e) assembling end crest forming dies 44 and 45 (FIGS. 6 and 7) externally in and circumferentially around each of the annular grooves 18 and 23 respectively adjacent the outer extremities 30 and 31 of the bellows cuffs forming portions 32 and 33 respectively of the multi-ply tube 6, the end crest forming dies 44 and 45 being spaced from the corrugation root constraining and crest forming dies 34 to 37 and having substantially planar sides such as side 48 of end crest forming die 44, extending outwardly from the multi-ply tube 6 and tangentially from rounded corner portions 49 and 50 leading from inner extremities 52 and 53 of the tube portions 32 and 33 respectively which are to form the bellows cuffs, to outer, rounded crest forming end portion 54 of end crest forming die 44, then (f) pressurizing the bore of the multi-ply tube 6 with a fluid with the dies 34 to 37 and 44 and 45 in position while pushing the ends 56 and 57 (FIGS. 6 and 7) of the multi-ply tube 6 together to outwardly bulge the said substantially undeformed portions 11 to 15, adjacent annular grooves 19 to 22 respectively where root portions of corrugations are to be located to follow the substantially planar sides of the dies 34 to 37 and 44 and 45 and form annular folds 58 to 62 with rounded crests as shown in FIG. 7, then (g) removing all of the dies 34 to 37 and 44 and 45 from the annular grooves, then (h) placing spacing shims 64 to 67 around the multi-ply tube 6 and between the folds 58 to 62 as shown in FIG. 8, and compressing the multi-ply tube 6 longitudinally until all of the folds 58 to 62 are brought into contact with and gently hold the spacing shims 64 to 67 thereabetween, as shown in FIG. 9, and then (i) releasing the thus formed multi-ply bellows from the longitudinally applied compression and removing the shims 64 to 67 therefrom as shown in FIG. 10.

Accurately, longitudinally seam welded tubes produced according to the method described and claimed in U.S. Pat. No. 4,207,453, dated June 10, 1980, C. J. Astill, have been used as the tubular metal plies 1 to 4 with the seam welds displaced from one another in the circumferential direction.

It is important to note that the rolling machine of this embodiment is designed to operate in a verticle mode as shown in FIGS. 2 to 5. The tapered rollers 24 and 25 (FIG. 2) are two of the series of seven similar tapered rollers equally spaced around the shaft 17 by roller cage spacers, two of which are shown and designated 69 and 70, of the roller cage 78. The tapered rollers 26 and 27 are two of a series of seven similar tapered rollers equally spaced around the tapered, annular supporting surface of a stationary, axially fixed, tapered shaft 72 by roller cage spacers, two of which are shown and designated 73 and 74, of the roller cage 78. The tapered shaft 72 has a collar portion 76 with a sleeve section 77 of the roller cage 78 freely slideably and rotateably located thereon. The sleeve section 77 of the roller cage 78 has the spacers such as 69, 70, 73 and 74 attached thereto and maintains the rollers such as 24 and 25 spaced from the rollers such as 26 and 27. In operation (FIG. 3) the sleeve section 77 of the roller cage 78 spaces taper rollers such as 24 and 25 from rollers such as 26 and 27 the appropriate distance apart for the innermost ply 1 to be formed with rounded corners and without thinning of the material when the annular grooves 18 to 23 are being rolled.

The shaft 17 is slideably located in the bore 79 of the tapered shaft 72. The shaft 17 has a larger tapered portion 80 forming the other tapered, annular supporting surface, which in operation supports rollers such as 24 and 25, and a parallel portion 81 which is slideably located in a bearing 20 (FIG. 3). The tapered shaft 72 has a positioning sleeve 86 attached therearound to ensure correct positioning of the rollers such as 26 and 27 on the taper. The parallel portion of shaft 81 has a positioning sleeve 84 attached therearound to ensure correct positioning of the rollers such as 24 and 25 on the taper portion of the shaft 80. The unrolled part of the multi-ply tube 6 is gripped in a collet (not shown) and rotated during the rolling operation. The orbiting type, groove forming roller 9 is rotateably mounted in a slide (not shown) which moves it from the inoperative position shown in FIG. 2 towards the operative position shown in FIG. 3. When it is advanced from the inoperative position the groove forming roller 9 begins to rotate when it comes in contact with the rotating multi-ply tube 6 and continues to roll around the surface until it is fed to a full depth stop (not shown) at which point the annular groove is rolled to the desired depth.

When the multi-ply tube 6 has ceased to rotate the collet is released and the means for holding down the shaft 17 is removed and it is moved axially away from tapered shaft 72. (FIG. 2). As the multi-ply tube 6 is accurately advanced to the next location for rolling, the tapered rollers such as 24 and 25 are pushed inwardly by the previously rolled groove in the multi-ply tube 6 to the space, adjacent to that part of the shaft 17, which was created by total withdrawal of the shaft 17 from the tapered shaft 72. After the multi-ply tube 6 has been advanced to the appropriate position for the next groove the shaft 17 is axially moved to the operating position shown in FIG. 5. To ensure that rollers such as 24 and 25 move outwardly to allow the tapered shaft 80 to be axially advanced to the position shown in FIG. 3, small permanent magnets (not shown) are embedded in the wall of the groove forming roller 9. When the shaft 17 is in the operating position and the multi-ply tube 6 gripped firmly in the collet (not shown) the machine is ready to be set in motion to roll the next groove.

This process is repeated until all of the annular grooves 18 to 23 have been rolled into the multi-ply tube 6.

The crest forming dies 34 to 37 and 44 and 45 are split in halves along a diametrical axis and the halves are secured together in the annular grooves 18 to 23 in a conventional manner (not shown) to be removable therefrom. It will be noted that, in this embodiment, each adjacent pair of crest forming dies, such as those designated 44 and 34, form adjacent halves of an outer rounded crest between them.

The ends 56 and 57 (FIGS. 6 and 7) of the multi-ply tube 6 may be pushed towards each other by holding end crest forming die 45, by means not shown, against movement in the direction of the longitudinal axis of the multi-ply tube 6, while pushing the end crest forming die 44, by means not shown, in this direction and towards the held, end crest forming die 45 until all of the crest forming dies 34 to 37 and 44 and 45 are in contact.

The shims 64 to 67 may conveniently each comprise two half portions (not shown) which are attached together at one end in a pivotal manner like callipers to be placed on and straddle the multi-ply tube 6 between the folds 58 to 62 (FIG. 8).

When the multi-ply tube 6 has been formed into a bellows, the ends of the multi-ply tube 6 may be cut off to remove the portions containing the annular grooves 18 and 23.

Tests carried out by the applicants have shown that multi-ply metal bellows have a tendency to fail at the roots of the corrugations. This led the applicants to suspect that a multi-ply metal bellows having a relatively high strength at the root portions of the corrugations would have a longer working life, and multi-ply metal bellows produced according to the present invention have confirmed this.

The in rolling of the roots of the corrugations, according to the present invention, by the groove forming roller 9 while supporting the multi-ply tube 6 by rollers such as 24 to 27 (FIG. 3) conditions the metal at the roots of the corrugations. This inwardly rolling while supporting the multi-ply tube 6 work hardens the outer plies of the multi-ply tube 6 at the roots of the corrugations and these are the most stressed portions of the bellows when in operation and are subjected to the worst working conditions. The outer plies of the multi-ply metal tube at the roots of the corrugations need to be of high integrity while the inner plies at these positions can be regarded as a support for the outer plies. Even if one or more of the inner plies does fail then the bellows will still function as long as the outer ply does not fail.

Inward rolling the multi-ply tube 6, according to the present invention, has a further advantage in that negligible thinning of the plies of the bellows occurs particularly around the roots because as a result of good layering during inward rolling, stretching is minimized during the outward bulging of the plies of internal fluid pressure.

Yet another advantage of inward rolling the multi-ply tube 6, according to the present invention, is that the forming of the crown portions of the corrugations by subsequent outward bulging leaves crown material with negligible work hardening and minimal thinning because of negligible stretching during the bulging operating. The distribution of material deformation during cycling of the bellows is therefore re-arranged to eliminate the high probability of failure at the convolution roots as previously noted in refrence to a bellows test program.

Yet another advantage of the inward rolling according to the present invention is that the multi-ply bellows 6 can be made of metal which is unsuitable for production of bellows by known processes. For example, in the case of Inconel 600 (trademark) processes presently used either work harden the material in the wrong places or do very little work hardening. In the case of Inconel 625 (trademark), (which has greater yield strength and work hardens more readily) known mechanical forming processes are not suitable for making bellows. The corrosion resistant qualities and work hardened yield strength of these materials make them more difficult to work with but functionally more desirable to use in the manufacture of metal bellows.

It should be noted that an important feature of the present invention is the use of the shims 64 to 67 (FIG. 7) during the longitudinal compression of the multi-ply tube 6 because this feature forms a bellows which has gaps between its roots so that the root radius cannot be deformed by over compression.

The present invention is particularly useful for manufacture of high pressure bellows approximately 2,500 psi (approximately 1.7 MPa), up to approximately 2½ inches (approximately 65 mm) inside diameter.

Bellows according to the present invention have been successfully manufactured in accordance with the following data:
TUBE PLIES OF INCONEL 600 or 625 each ply: 0.008 in. (0.20 mm)
O/DIA. OF PLIED ASSEMBLY: 1.120 inch. (28.5 mm)
O/DI. OF INWARD ROLLED ROOT: 1.000 in. (25.4 mm)
O/DIA. OF CONVOLUTION CROWN AFTER HYDRAULIC FORMING: 1.440 in. (36.6 mm)
DEPTH OF CONVOLUTION: 0.220 in. (5.6 mm)
PITCH OF CONVOLUTION—AFTER COLLAPSING: 0.200 in. (5.1 mm)

| HYDRAULIC FORMING PRESSURES | |
|---|---|
| 3 PLY INCONEL 600 | 4500 psig (31 Mpa) |
| 4 PLY INCONEL 600 | 5000 psig (34 Mpa) |
| 3 PLY INCONEL 625 | 5500 psig (38 Mpa) |
| 4 PLY INCONEL 625 | 6000 psig (41 Mpa) |

Advantages obtained by producing corrugated, multi-ply bellows according to the present invention are:

(i) the depth of the inwardly rolled grooves and/or the axial distance between grooves can be readily changed to produce a corrugation shape more suited to a particular bellows application.

(ii) within practical limits the number of plies or wall thickness of the bellows can be readily practically changed due to the unique method of internal roller support for the multiply tube during the inward rolling operation of each corrugation root.

(iii) within practical limits the number of corrugations (or length of bellows can be readily changed due to the unique method of internal roller support for the multi-ply tube during the inward rolling operation of the convolution root.

(iv) the shims can be used between the root constraining and crest forming dies and end crest forming dies to obtain minimal changes to the root shape during the hydraulic forming operating thus facilitating precise development of a corrugation shape to suit a particular bellows application.

In some embodiments of the present invention the root constraining and crest forming dies have slightly tapered planar sides which allow for hydraulically wrapping the multiply tube around the root radius of the dies for more than the 180°. In this embodiment residual elastic stresses in the multi-ply tube material cause axial extension of the bellows which allows removal of the dies after hydraulic forming. This allows for further removal of material stresses in the multi-ply tube material which can occur during the operation in which the multi-ply tube is longitudinally compressed until the folds are brought into contact with and gently hold the spacing shims.

We claim:

1. A method of producing a corrugated, multi-ply, metal bellows, comprising:
 (a) telescoping together, in a substantially coextensive manner, a number of tubular, metal plies to form a multi-ply tube, then
 (b) successively, from a first end of the multi-ply tube, internally supporting in substantially the tubular form, only portions of the multi-ply tube which are to be adjacent opposite sides of each of a series of longitudinally spaced, annular grooves to be inwardly formed in the multi-ply tube, each of said portions of the multi-ply tube being supported by a series of tapered, rounded corner forming, rollers spaced by a roller cage around a tapered, annular supporting surface on a supporting shaft extending through, and supported at each end of, the multi-ply tube, the tapered rollers being moved radially outwardly into lengthwise, supporting engagement with, and withdrawn from, the multi-ply tube by relative movement, along the axis of the tube, between the tapered rollers and their supporting surfaces, while (c) successively, inwardly rolling, from the first end of the multi-ply tube, each of the series of longitudinally spaced, annular grooves with rounded corners, in the multi-ply tube, while only the said portions of the multi-ply tube adjacent opposite sides of that annular groove are supported in the said substantially tubular form to remain substantially undeformed, and while the multi-ply tube is allowed to decrease in length to accommodate the formation of the annular grooves, the series of longitudinally spaced, annular grooves providing,
  (i) annular grooves adjacent outer extremities of bellows cuffs forming portions of the multi-ply tube, and
  (ii) annular grooves where root portions of corrugations are to be located at positions between the bellows cuffs forming portions, then
(d) separating the multi-ply tube from the supporting shaft and radially displaceable rollers and assembling spaced, corrugation root constraining and crest forming dies externally in and circumferentially around each of the annular grooves at which root portions of the corrugations are to be located, the dies being spaced from each other and having substantially planar sides extending outwardly from the multi-ply tube and tangentially from inner, rounded root constraining ends to outer, rounded crest end portions, then
(e) assembling end crest forming dies externally in and circumferentially around each of the annular grooves adjacent the outer extremities of the bellows cuffs forming portions of the multi-ply tube, the end crest forming dies being spaced from the corrugation root constraining and crest forming dies and having substantially planar sides extending outwardly from the multi-ply tube and tangentially from rounded corner portions leading from inner extremities of the tube portions which are to form the bellows cuffs, to outer, rounded crest forming end portions, then
(f) pressurizing the bore of the multi-ply tube with a fluid with the dies in position while pushing the ends of the multi-ply tube together to outwardly bulge the said substantially undeformed portions, adjacent annular grooves where root portions of corrugations are to be located, to follow the substantially planar sides of the dies and form annular folds with rounded crests, then
(g) removing all of the dies from the annular grooves, then
(h) placing spacing shims around the multi-ply tube and between the folds, and compressing the multi-ply tube longitudinally until all of the folds are brought into contact with and gently hold the spacing shims therebetween, and then
(i) releasing the thus formed multi-ply bellows from the longitudinally applied compression and removing the shims therefrom.

2. A method according to claim 1, wherein the ends of the multi-ply tubing are pushed together, while the bore of the multi-ply tube is pressurized with a fluid, by holding one of the end crest forming dies against movement, in the direction of the longitudinal axis of the multi-ply tubing, while pushing the outer end crest forming die in this direction and towards the held end crest forming die.

3. A method according to claim 1, wherein both series of radially displaceable rollers taper, in a divergent manner, along their axis of rotation, towards one another and are supported on corresponding tapering, annular supporting surfaces, and the rollers are retracted radially by relative movement along the axis of the multi-ply tube of the supporting surfaces moving them apart.

4. A method according to claim 3, wherein both series of rollers are held spaced apart and are retracted radially by movement of one supporting surface, supporting one series of rollers, away from the other supporting surface supporting the other series of rollers.

* * * * *